(12) United States Patent
Hopkins (10) Patent No.: US 11,254,387 B2
(45) Date of Patent: Feb. 22, 2022

(54) DUAL LINKAGE FRONT FORK WITH STEERING LOCK FOR SCOOTER

(71) Applicant: Sunluxe eBike LLC, Boca Raton, FL (US)

(72) Inventor: Carey Vincent Hopkins, Seattle, WA (US)

(73) Assignee: Sunluxe Enterprises Limited, Hong Kong (CN)

( * ) Notice: Subject to any disclaimer, the term of this patent is extended or adjusted under 35 U.S.C. 154(b) by 188 days.

(21) Appl. No.: 16/392,627

(22) Filed: Apr. 24, 2019

(65) Prior Publication Data

US 2020/0339209 A1 Oct. 29, 2020

(51) Int. Cl.
*B62K 5/10* (2013.01)
*B62K 5/05* (2013.01)
*B62K 5/08* (2006.01)

(52) U.S. Cl.
CPC .............. *B62K 5/10* (2013.01); *B62K 5/05* (2013.01); *B62K 5/08* (2013.01)

(58) Field of Classification Search
CPC ... B62K 5/10; B62K 5/08; B62K 5/05; B62K 5/06; B62D 9/04
USPC ........................ 280/124.103, 267, 268, 269
See application file for complete search history.

(56) References Cited

U.S. PATENT DOCUMENTS

| | | | |
|---|---|---|---|
| 6,607,207 B2 | 8/2003 | Shapiro et al. | |
| 6,832,660 B2 | 12/2004 | Dodd | |
| 7,407,172 B2 | 8/2008 | Ming | |
| 8,419,027 B2 * | 4/2013 | Ting | B62K 5/02 280/93.511 |
| 9,205,890 B2 | 12/2015 | Schreuder et al. | |
| 2017/0210440 A1 | 7/2017 | Dragomir | |

FOREIGN PATENT DOCUMENTS

| | | | | |
|---|---|---|---|---|
| AT | 515074 | | 7/2011 | |
| CN | 109367668 A | * | 2/2019 | |
| EP | 3069979 A2 | * | 9/2016 | ............... B62K 5/05 |
| FR | 2995255 A1 | * | 3/2014 | ............ B60G 17/005 |

(Continued)

OTHER PUBLICATIONS

"Mylo", retrieved from {https://ridemylo.com/}, May 23, 2018.

(Continued)

*Primary Examiner* — Kevin Hurley
*Assistant Examiner* — Hosam Shabara
(74) *Attorney, Agent, or Firm* — North Shore Patents, P.C.; Michele Liu Baillie (57) ABSTRACT

A vehicle includes a dual linkage assembly coupled to two front wheels and a fork. The dual linkage assembly includes arms coupled at pivot points. Each arm rotates independently at the pivot points and responds to force applied by the rider, such that both front wheels maintain contact with the ground. The vehicle further includes a lock assembly including a lever and a lock block coupled to the front fork, a first piece with a first notch coupled to one or more of the arms, and a second piece with a second notch coupled to a head tube. When locked, the lock block engages the first notch, preventing the dual linkage assembly from rotating, and engages the second notch, preventing the fork from rotating. The vehicle is then capable of standing upright without assistance from a rider or stand.

7 Claims, 7 Drawing Sheets

(56) References Cited

FOREIGN PATENT DOCUMENTS

WO 1996001204 A1 1/1996
WO 2013087876 A1 6/2013

OTHER PUBLICATIONS

"About Us—Mylo", retrieved from {https://ridemylo.com/about/}, May 15, 2018.
"Mylo—Gallery", retrieved from {https://ridemylo.com/gallery/}, May 15, 2018.
"Black Super Turbo 1000watt Elite 36v Electric Scooter with Econo/Turbo Mode Button", Tesla Ride, retrieved from https://teslaride.xyz/product/black-super-turbo-1000watt-elite-36v-electric-scooter-with-econoturbo-mode-button/, May 6, 2018.

* cited by examiner

DUAL LINKAGE FRONT FORK WITH STEERING LOCK FOR SCOOTER

STATEMENT REGARDING PRIOR DISCLOSURES BY THE INVENTOR OR A JOINT INVENTOR

The following disclosure(s) are submitted under 35 U.S.C. 102(b)(1)(A):

"Mylo", at ridemylo.com, dated May 23, 2018.
"About Us—Mylo", at ridemylo.com/about/, dated May 15, 2018.
"Mylo—Gallery", at ridemylo.com/gallery/, dated May 15, 2018.

BACKGROUND OF THE INVENTION

Conventional three-wheeled scooters have either two wheels in the front or back. When a rider makes a turn with the scooter, the rider typically leans the scooter, which can cause one of the two wheels to lift off the ground or otherwise lose some contact with the ground. This results in instability.

Further, when not being ridden, conventional three-wheeled scooters are unable to stay upright without the assistance of an integrated or separate stand. This makes the scooter difficult to store.

BRIEF SUMMARY OF THE INVENTION

Disclosed herein is a vehicle comprising at least three wheels as specified in the independent claims. Embodiments of the present invention are given in the dependent claims. Embodiments of the present invention can be freely combined with each other if they are not mutually exclusive.

According to one embodiment of the present invention, the vehicle includes a first and second front wheel, a front fork, and a dual linkage assembly. The dual linkage assembly includes: a first upper arm and a second upper arm, a first lower arm and a second lower arm; and a first upright and a second upright. A first end of the first upright is coupled to the first front wheel, and a second end of the first upright is coupled to a first end of the first upper arm at a first upper outer pivot point. The second end of the first upright is also coupled to a first end of the first lower arm at a first lower outer pivot point. A first end of the second upright is coupled to the second front wheel, and a second end of the second upright is coupled to a first end of the second upper arm at a second upper outer pivot point. The second end of the second upright is also coupled to a first end of the second lower arm at a second lower outer pivot point. A second end of the first upper arm is coupled to a second end of the second upper arm and the front fork at an upper center pivot point. A second end of the first lower arm coupled to a second end of the second lower arm and the front fork at a lower center pivot point. The first upper arm, the second upper arm, the first lower arm, and the second lower arm each rotate independently at the corresponding first upper outer pivot point, the second upper outer pivot point, the first lower outer pivot point, the second lower outer pivot point, the upper center pivot point, and the lower center pivot point.

In one aspect of the present invention, the vehicle further includes a lock assembly. The lock assembly includes: a first lock engagement piece rigidly coupled to the first upper arm and the second upper arm, where the first lock engagement piece includes a first notch; a lock block coupled to the front fork at a first lock pivot point; and a lever coupled to the front fork at a second lock pivot point and to the lock block.

In one aspect of the present invention, when in a locked position, a front portion of the lock block engages the first notch, where the first upper arm and the second upper arm are prevented from rotating.

In one aspect of the present invention, when in an unlocked position, the front portion of the lock block is disengaged from the first notch.

In one aspect of the present invention, the lock block further includes a protrusion at a back end, and the lock assembly further includes a second lock engagement piece coupled to a head tube, where the second lock engagement piece includes a second notch. When in a locked position, the protrusion engages the second notch, where the front fork is prevented from rotating. When in an unlocked position, the protrusion is disengaged from the second notch.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, elements, components, and/or groups thereof.

The following reference numbers are used herein:
100 dual linkage assembly
101 frame
102 head tube
103 front fork
104 fork tube
105 crowns
106 handle bars
107A first front wheel
107B second front wheel
107C back wheel
108A first upper arm
108B second upper arm
109A first lower arm
109B second lower arm
110 upper center pivot point
111 lower center pivot point
112A first upright
112B second upright
113 middle bar
114A first upper coupling mechanism
114B first lower coupling mechanism
114C second upper coupling mechanism
114D second lower coupling mechanism
114E upper center coupling mechanism
114F lower center coupling mechanism
115A first upper outer pivot point
115B first lower outer pivot point
116A second upper outer pivot point
116B second lower outer pivot point
120 lock assembly
121 first lock engagement piece
122 first notch (in first lock engagement piece 121)
123 lock block
124 short arm
125 lever
126 front arm (of lever 125)
127 handle (of lever 125)
128 first lock pivot point
129 second lock pivot point
130 third lock pivot point
131 fourth lock pivot point
132 second lock engagement piece
133 second notch (in second lock engagement piece 132)
134 protrusion (of lock block 123)

FIGS. 1-4 illustrate a perspective view, top view, front view, and side view, respectively, of a scooter with a dual linkage assembly 100 in a locked position according to some embodiments. The scooter includes a frame 101, a front fork 103, a first front wheel 107A, a second front wheel 107B, and a back wheel 107C. Coupled to the front fork 103 are a set of handle bars 106 for steering the scooter. The scooter further includes a dual linkage assembly 100 coupled to the front fork 103. The dual linkage assembly 100 includes a first upright 112A and a second upright 112B. The first upright 112A has a first end and a second end, where the first end is coupled to the first front wheel 107A. The second upright 112B has a first end and a second end, where the first end is coupled to the second front wheel 107B. The dual linkage assembly 100 further includes a first upper arm 108A, a second upper arm 108B, a first lower arm 109A, and a second lower arm 109B. Each of the arms 108A-108B and 109A-109B has a first end and a second end. The second end of the first upright 112A is coupled to a first end of the first upper arm 108A at a first upper outer pivot point 115A and coupled to a first end of the first lower arm 109A at a first lower outer pivot point 115B. The second end of the second upright 112B is coupled to a first end of the second upper arm 108B at a second upper outer pivot point 116A and coupled to a first end of the second lower arm 109B at a second lower outer pivot point 116B. The second ends of the first and second upper arms 108A-108B are coupled at an upper center pivot point 110, and the second ends of the first and second lower arms 109A-109B are coupled at a lower center pivot point 111. Optionally, a middle bar 113 can be coupled to the upper and lower center pivot points 110-111 to add stiffness. In some embodiments, the arms 108A-108B are positioned approximately parallel to the arms 109A-109B, with arms 109A-109B positioned closer to the front wheels 107A-107B than the arms 108A-108B. A first lock engagement piece 121 of a lock assembly 120 is rigidly coupled to the first and second upper arms 108A-108B, as described further below with reference to FIGS. 10-12B.

FIGS. 5-8 illustrates a perspective view, top view, front view, and side view, respectively, of a scooter with a dual linkage assembly 100 in an unlocked position according to some embodiments. When a rider turns the scooter, the rider typically leans to one side of the scooter, toward the turn. In response, the arms 108A-108B and 109A-109B each rotate independently along the six pivot points 110, 111, 115A, 115B, 116A, and 116B, and the front fork 103 is free to rotate to turn the scooter. The rotations at the six pivot points 110, 111, 115A, 115B, 116A, and 116B responds to the force applied to the scooter by the rider, such that both front wheels 107A-107B maintain contact with the ground during the turn, increasing the stability of the scooter.

Figure 1:
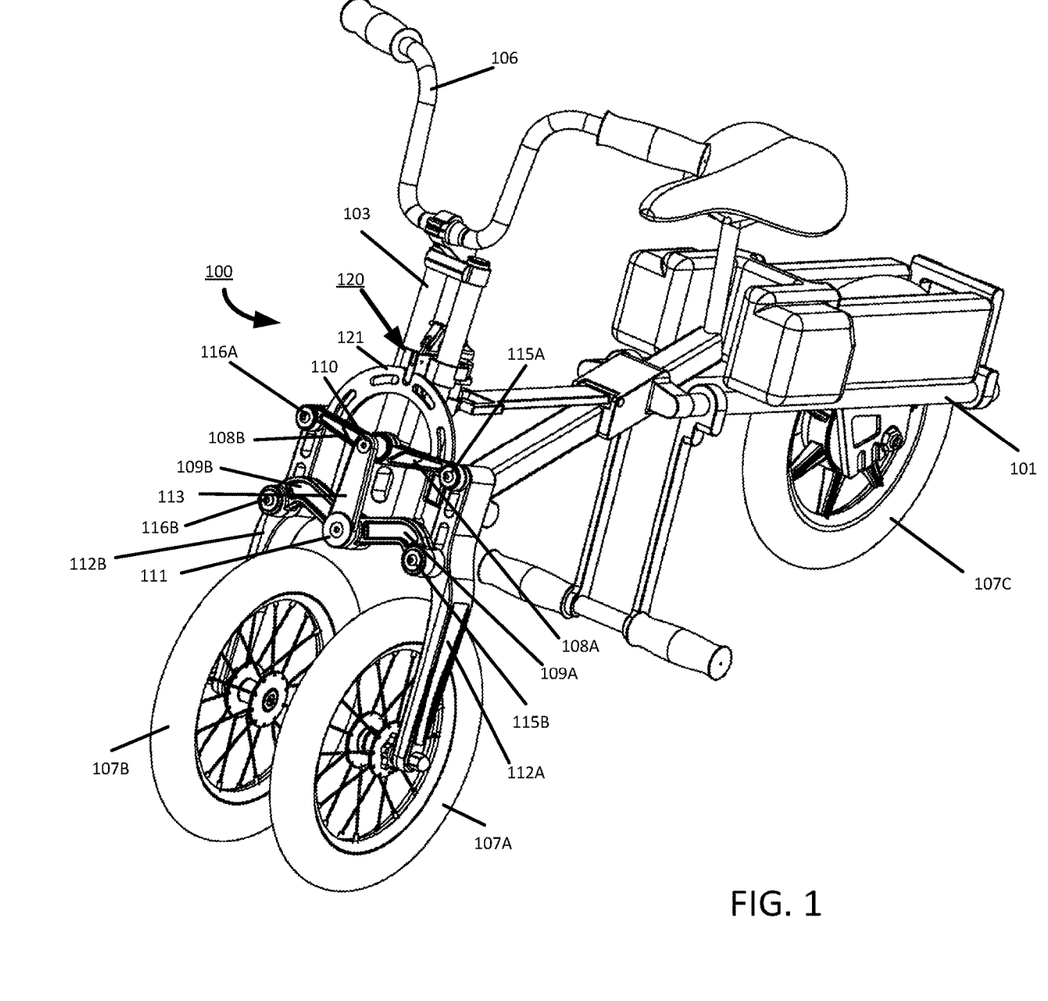
FIGS. 1-4 illustrate a perspective view, top view, front view, and side view, respectively, of a scooter with a dual linkage assembly in a locked position according to some embodiments.
Figure 2:
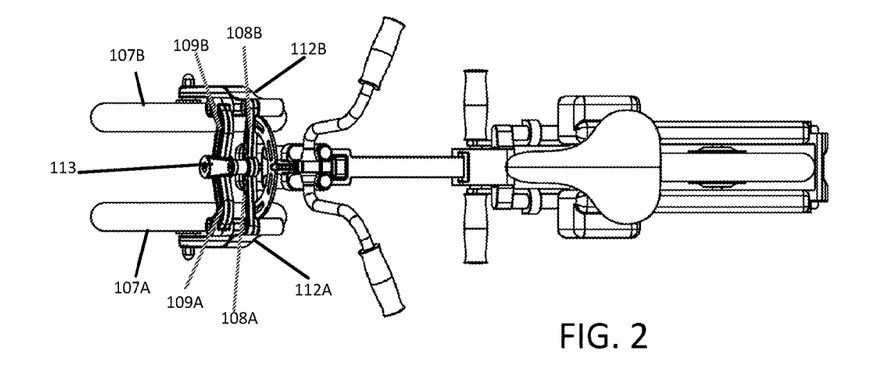
Figure 3:
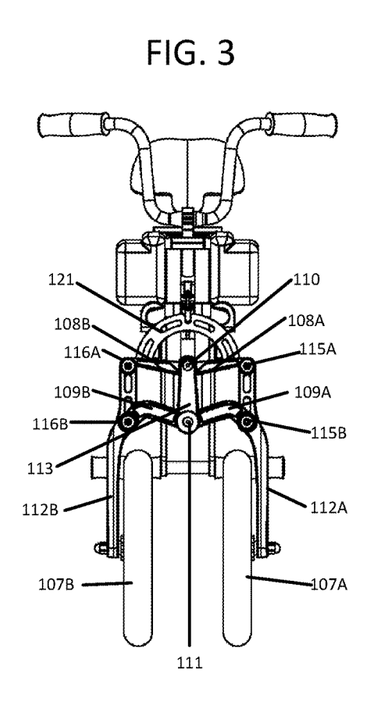
Figure 4:
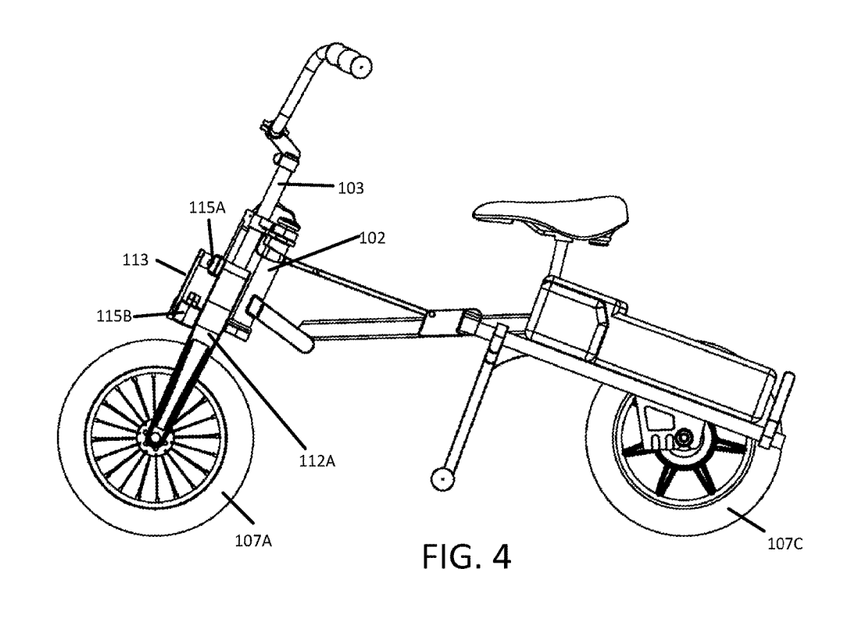
Figure 5:
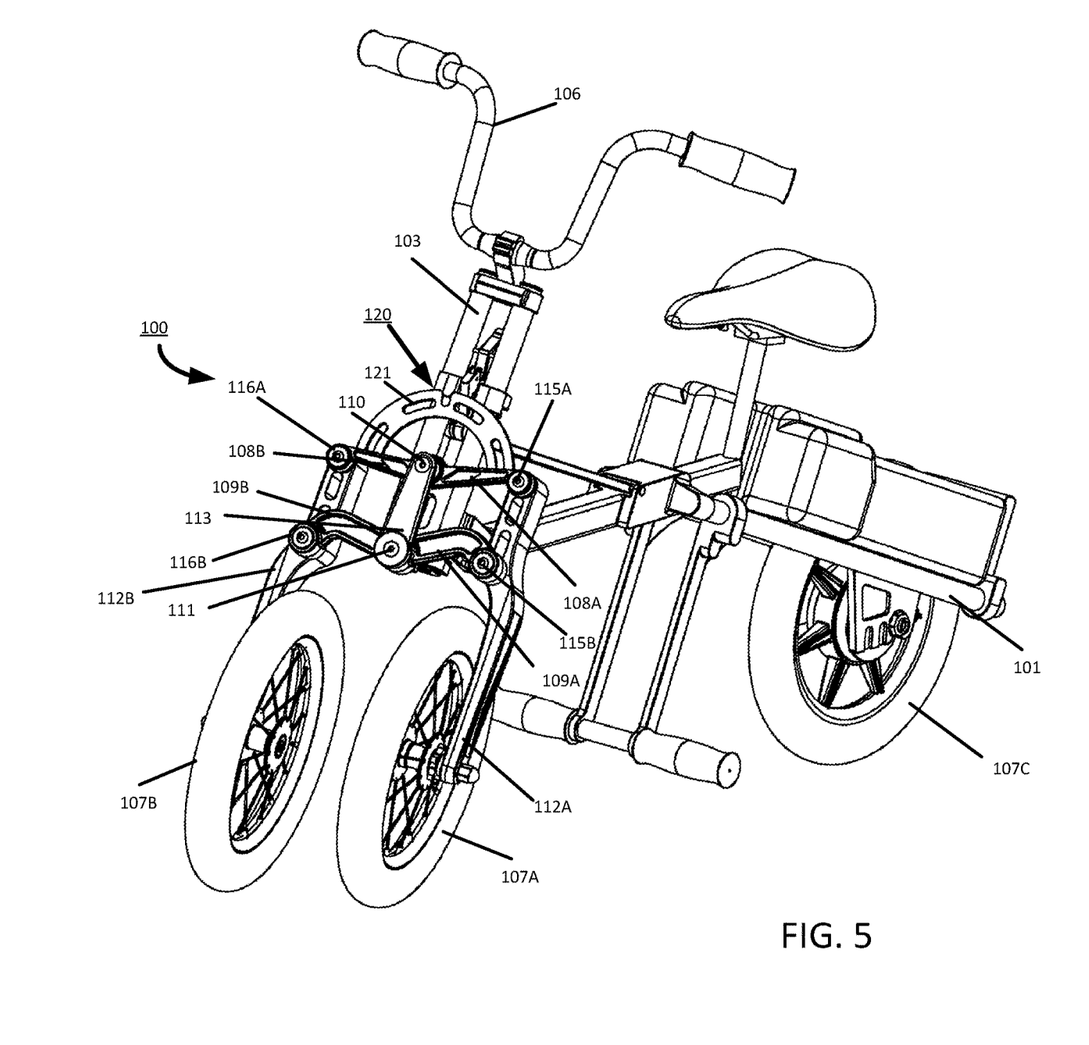
FIGS. 5-8 illustrates a perspective view, top view, front view, and side view, respectively, of a scooter with a dual linkage assembly in an unlocked position according to some embodiments.
Figure 6:
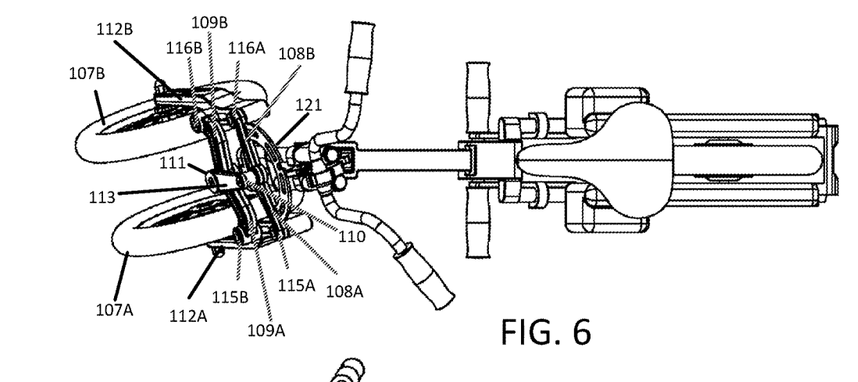
Figure 7:
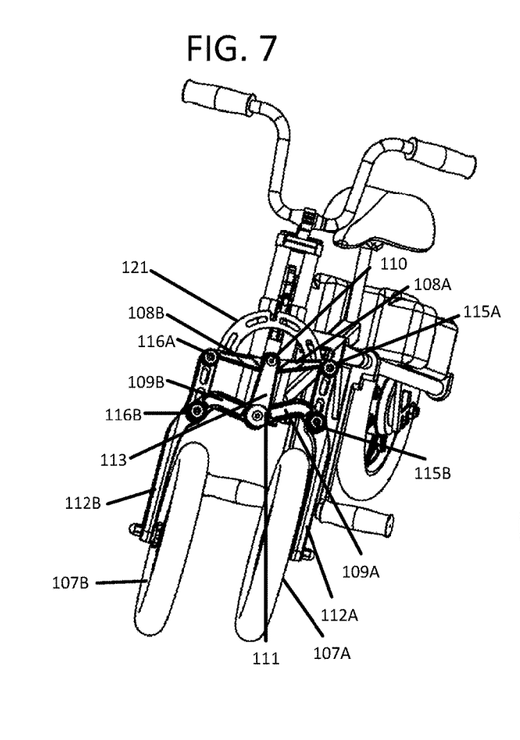
Figure 8:
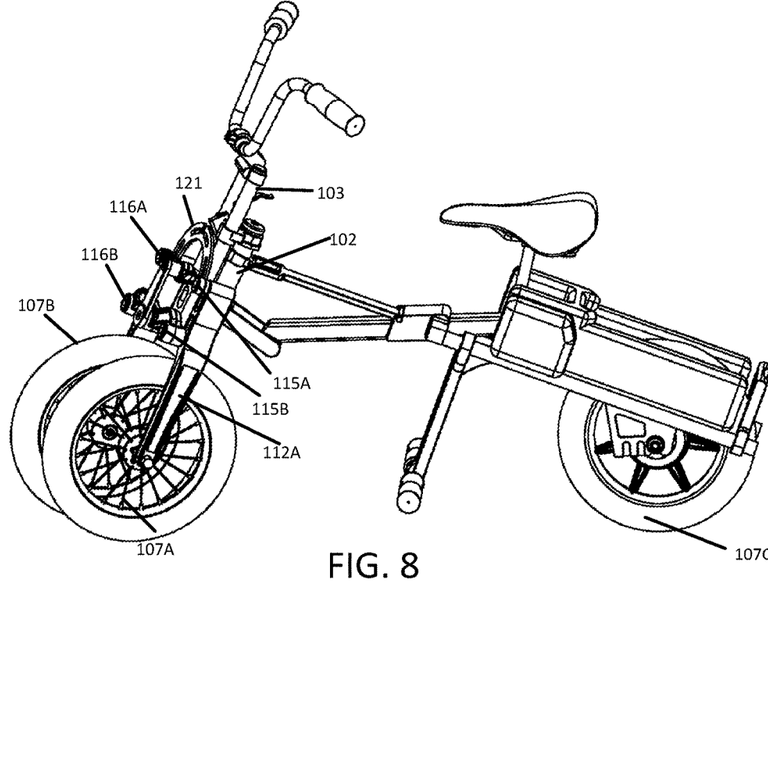
Figures 9A, 9B:
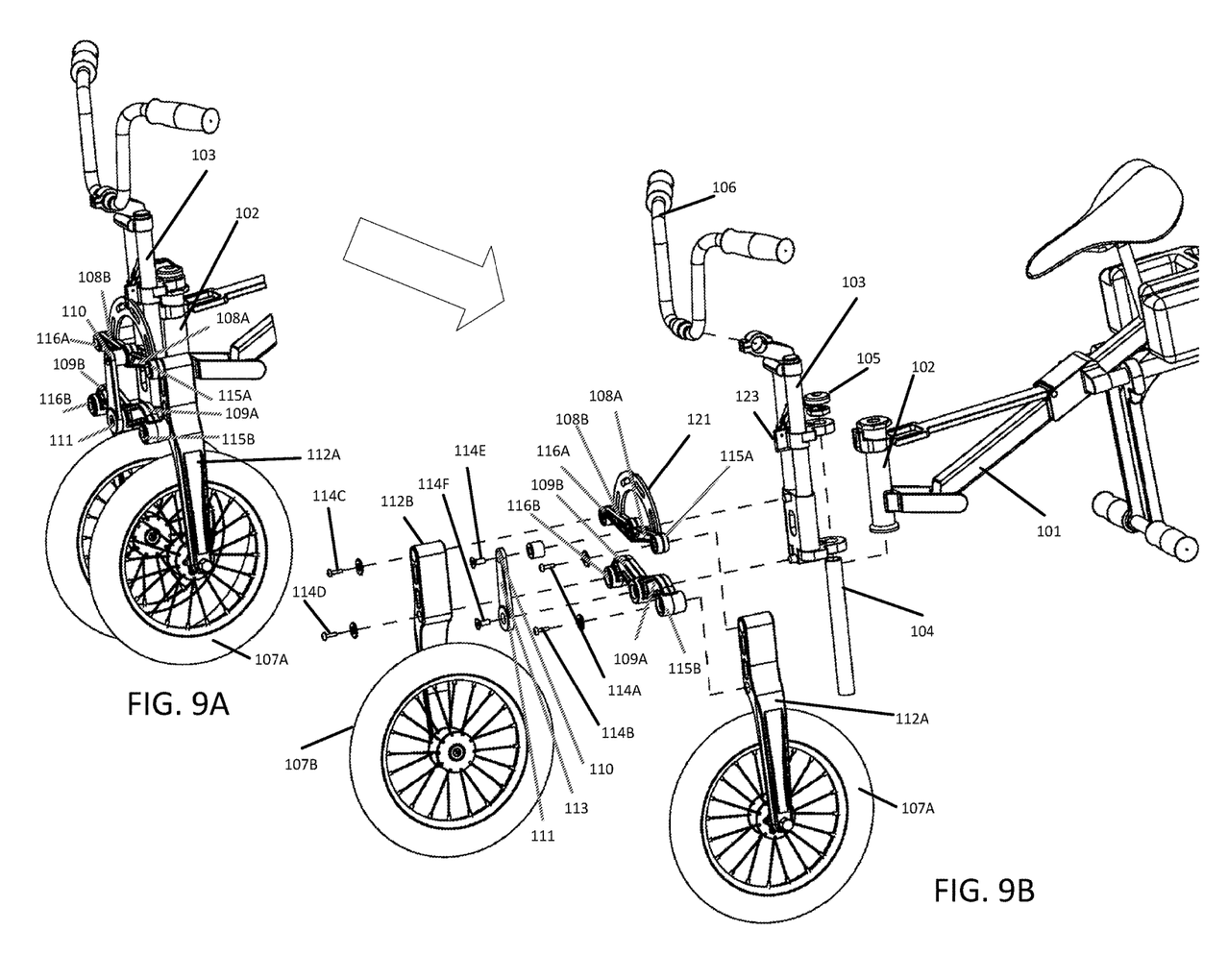
FIG. 9A illustrates an isolated perspective view of the dual linkage assembly, according to some embodiments.
FIG. 9B illustrates a corresponding exploded view of the dual linkage assembly, according to some embodiments.

FIG. 9A illustrates an isolated perspective view of the dual linkage assembly 120, and FIG. 9B illustrates a corresponding exploded view of the dual linkage assembly 120, according to some embodiments. In addition to the components as described above, the dual linkage assembly 100 includes a first upper coupling mechanism 114A that couples the first ends of first upper arm 108A to the second end of the first upright 112A, providing the first upper outer pivot point 115A. A first lower coupling mechanism 114B couples the first ends of the first lower arm 109A to the second end of the first upright 112A at a position closer to the first front wheel 107A, providing the first lower outer pivot point 115B. A second upper coupling mechanism 114C couples the first end of the second upper arm 108B to the second end of the second upright 112B, providing the second upper outer pivot point 116A. A second lower coupling mechanism 114D couples the first end of the second lower arm 109B to the second end of the second upright 112B at a position closer to the second front wheel 107B, providing the second lower outer pivot point 116B. An upper center coupling mechanism 114E couples the second ends of the first and second upper arms 108A-108B to the front fork 103, providing the upper center pivot point 110. A lower center coupling mechanism 114F couples the second ends of the first and second lower arms 109A-109B to the front fork 103, providing the lower center pivot point 111. In the illustrated embodiments, the dual linkage assembly 100 is directly coupled to the front fork 103 via the upper and lower center coupling mechanisms 114E-114F and not the other coupling mechanisms 114A-114D. In some embodiments, the coupling mechanisms 114A-114F include a combination of bolts traversing corresponding openings in the ends of the arms 108A-108B, 109A-109B and the ends of uprights 112A-112B, around which they may rotate.

The front fork 103 is further coupled to a head tube 102 of the frame 101 via a fork tube 104 inserted through the head tube 102. A set of crowns 105 couples the front fork 103 to the fork tube 104 and allows the fork tube 104 to rotate within the head tube 102 as the front fork 103 is rotated.

Figure 10:
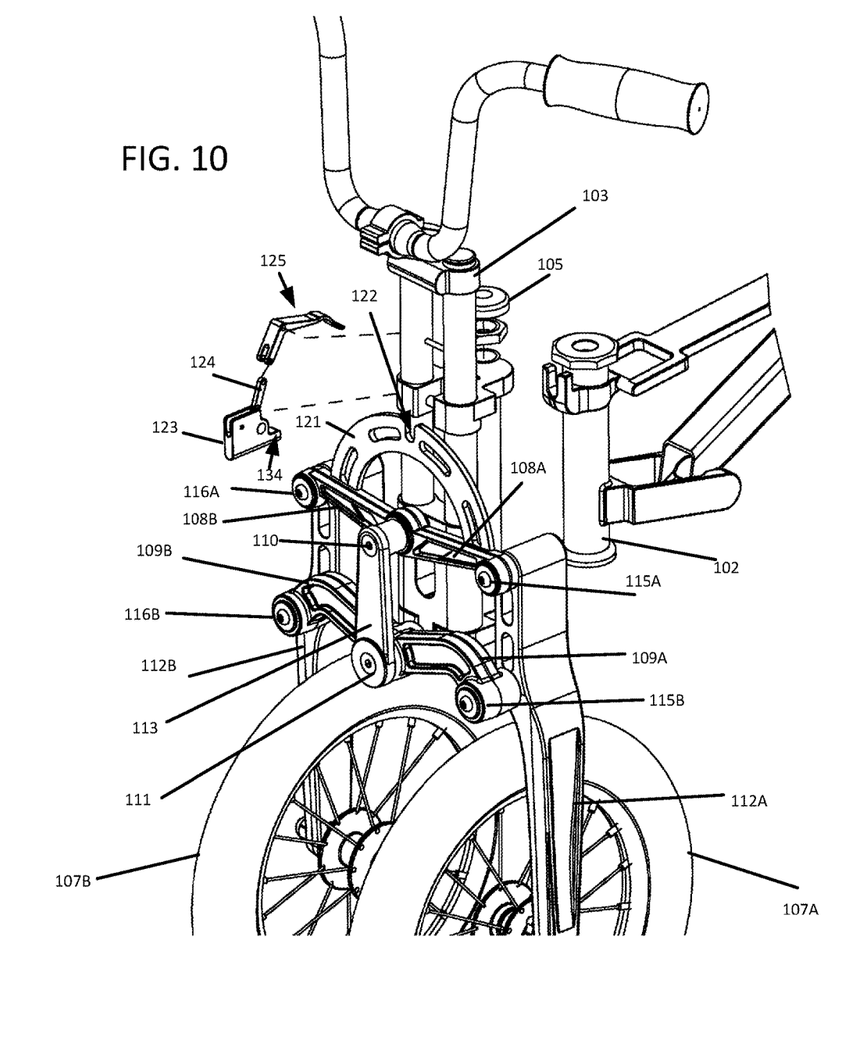
FIG. 10 illustrates a close-up perspective view of the lock assembly, according to some embodiments.

FIGS. 10, 11A-11E, and 12A-12B illustrate the lock assembly 120 of the scooter according to some embodiments. FIG. 10 illustrates a close-up perspective view of the lock assembly 120. The lock assembly includes a first lock engagement piece 121 rigidly coupled to the first and second upper arms 108A-108B. The first lock engagement piece 121 includes a first notch 122. The lock assembly 120 further includes a lock block 123 and a lever 125 coupled to the fork 103, as described further below. A short arm 124 couples the lock block 123 to the lever 125.

FIGS. 11A-11D illustrate cross-sectional views of the lock assembly 120 in a locked, moving-over-center, unlocking-over-center, and locked states, respectively, according to some embodiments. FIGS. 11A-11D provide a detailed view of the lock assembly 120 as indicated by FIG. 11E. The lock block 123 is coupled to the fork 103 at a first lock pivot point 128, around which the lock block 123 may rotate. The lever 125 is coupled to the fork 103 at a second lock pivot point 129, around which the lever 125 may rotate. The lock block 123 is coupled to a first end of the short arm 124 at a third lock pivot point 130, round which the lock block 123 and the short arm 124 may rotate. A second end of the short arm 124 is coupled to the lever 125 at a fourth lock pivot point 131, around which the short arm 124 and the lever 125 may rotate. Coupling mechanisms (not shown), such as bolts or screws, are used at the lock pivot points 128-131, around which the lock block 123, the short arm 124, and the lever 125 may rotate. The lever 125 includes a front arm 126 and handle 127. The front arm 126 is the portion of the lever 125 from the fourth lock pivot point 131 to the $2^{nd}$ lock pivot point 129. The handle 127 is the portion of the lever 125 from the second lock pivot point 129 to the end of the lever 125. A rider interfaces with the lock assembly 120 by pulling up on the handle 127 to disengage the lock assembly 120 or by pushing down on the handle 127 to engage the lock assembly 120.

Figure 11A:
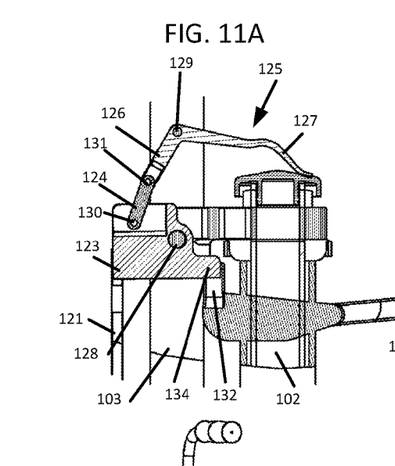
FIG. 11A illustrates a cross-sectional view of the lock assembly in a locked state, according to some embodiments.
Figure 12A:
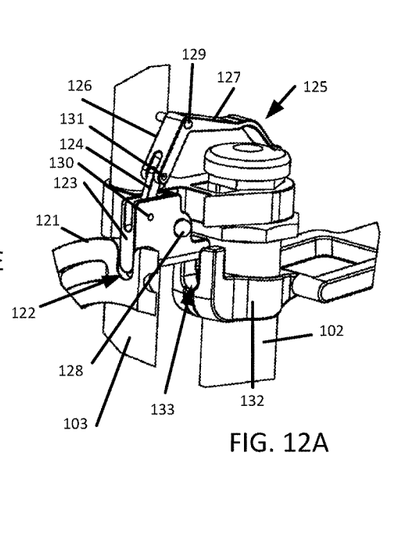
FIG. 12A illustrates a close-up view of the lock block protrusion and the second lock engagement piece in a locked position, according to some embodiments.

As illustrated in FIG. 11A, when in the locked position, a front portion of the lock block 123 engages the first notch 122, where the front end of the lock block 123 rests inside the first notch 122 (see also FIGS. 1-3 and 10). This prevents the first and second upper arms 108A-108B from rotating around the first and second upper outer pivot points 115A and 116A, which in turn prevents rotation in the other pivot points 115B, 116B, 110, and 111. The lock block 123 includes a protrusion 134 at the back end (see also FIG. 10). Corresponding to the protrusion 134 is a second lock engagement piece 132 coupled to the head tube 102. As illustrated in FIG. 12A, the second lock engagement piece 132 includes a second notch 133. When in the locked position, the protrusion 134 engages the second notch 133, where the protrusion 134 rests within the second notch 133. This prevents the fork 103 from articulating or rotating within the head tube 102. In this locked position, the scooter is capable of standing upright, with both front wheels 107A-107B contacting the ground, without assistance from a rider or an integrated or separate stand, making the scooter easier to store.

Figure 11B:
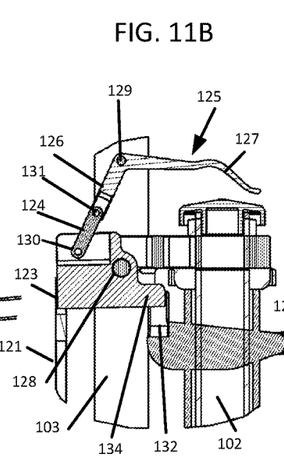
FIG. 11B illustrates a cross-sectional view of the lock assembly in a moving-over-center state, according to some embodiments.

As illustrated in FIG. 11B, when a rider pulls up on the handle 127, the lever 125 rotates around the second lock pivot point 129 and the short arm 124 rotates around the third and fourth lock pivot points 130-131. At a point in the rotation, the short arm 124 and the front arm 126 of the lever 125 align, i.e., positioned end to end, placing the lock assembly 120 in the moving-over-center state. In this position, the combination of the aligned length of the short arm 124 and the front arm 126 is longer than the straight-line length from the second lock pivot point 129 to the third lock pivot point 130. Due to this fact, there is resistance to further rotation of the lever 125 and short arm 124. Further in the moving-over-center state, the lock block 123 has not rotated at the first lock pivot point 128, and the front end of the lock block 123 remains engaged with the first notch 122. In order to overcome the resistance, additional pull force on the handle 127 must be applied. This prevents accidental unlocking of the lock assembly 120, which would otherwise lead to unsafe conditions.

Figure 11C:
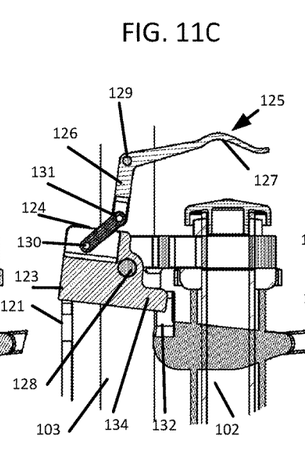
FIG. 11C illustrates a cross-sectional view of the lock assembly in an unlocking-over-center state, according to some embodiments.

As illustrated in FIG. 11C, when additional pull force is applied to the handle 127 to overcome the resistance, the short arm 124 continues to rotate around the third and fourth lock pivot points 130-131, and the lever 125 continues to rotate around the second lock pivot point 129, placing the lock assembly 120 in the unlocked-over-center state. In this state, the lock block 123 begins to rotate around the first lock pivot point 128, which begins to lift the front end of the lock block 123 out of the first notch 122 and begins to rotate the protrusion 134 out of the second notch 133.

Figure 11D:
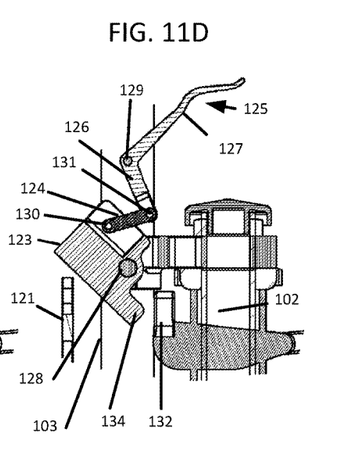
FIG. 11D illustrate cross-sectional views of the lock assembly in a locked state, according to some embodiments.
Figure 11E:
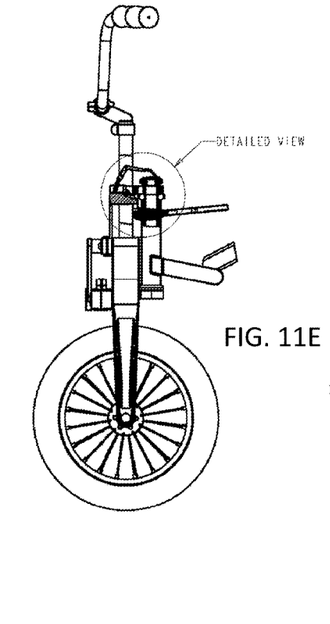
FIG. 11E illustrates the lock assembly indicating a portion for which detailed views are provided in FIGS. 11A-11D.
Figure 12B:
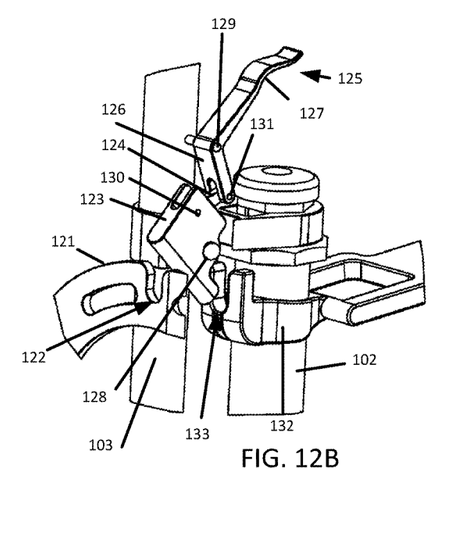
FIG. 12B illustrates a close-up view of the lock block protrusion and the second lock engagement piece in an unlocked position, according to some embodiments.

As illustrated in FIG. 11D, when the lever 125 is fully rotated, the lock assembly 120 is placed in the unlocked position. In the unlocked position, the lock block 123 is fully disengaged from the first notch 122, allowing the arms 108A-108B and 109A-109B to articulate or rotate, as described above with FIGS. 5-8. As illustrated in FIG. 12B, the protrusion 134 of the lock block 123 is also fully disengaged from the second notch 133, allowing the fork 103 to rotate within the head tube 102.

From the unlocked position illustrated in FIG. 11D, when a push force is applied to the handle 127, the lever 125 rotates at the second lock pivot point 129, causing the short arm 124 to rotate at the third and fourth lock pivot points 130-131, which in turn causes the lock block 123 to rotate at the first and fourth lock pivot points 128, 130. The lock block 123 rotates toward the first notch 122. With continued force applied to the handle 127, the lever 125 eventually becomes fully rotated, and the lock block 123 engages the first notch 122, placing the lock assembly in the locked position illustrated in FIG. 11A.

Although the present invention is described above in the context of a scooter, embodiments of the present invention may be applied to other types of vehicles with at least three wheels without departing from the spirit and scope of the present invention.

Although the dual linkage lock assembly is described above with the six pivot points, additional pivot points may also be used without departing from the spirit and scope of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A vehicle comprising at least three wheels, comprising:
    a first front wheel;
    a second front wheel;
    a front fork;
    a dual linkage assembly coupled to the first front wheel, the second front wheel, and the front fork; and
    a lock assembly, comprising:
        a first lock engagement piece rigidly coupled to the dual linkage assembly, the first lock engagement piece comprising a first notch;
        a lock block comprising a first notch and coupled to the front fork at a first lock pivot point; and
        a lever coupled to the front fork at a second lock pivot point and to the lock block,
        wherein when in a locked position, a front portion of the lock block engages the first notch, wherein the dual linkage assembly is prevented from rotating,
        wherein when in an unlocked position, the front portion of the lock block is disengaged from the first notch.

2. The vehicle of claim 1, wherein when in the locked position, the vehicle is capable of standing upright on the first and second front wheels without assistance from a rider.

3. The vehicle of claim 1, wherein from the locked position, a rotation of the lever at the second lock pivot point causes a rotation of the lock block at the first lock pivot point, wherein the front portion of the lock block rotates away from the first notch.

4. The vehicle of claim 1, wherein the lever comprising a handle and a front arm, wherein the lock assembly further comprises a short arm coupled to the lock block at a third lock pivot point and coupled to the front arm of the lever at a fourth lock pivot point,
    wherein from the locked position, as the lever rotates at the second lock pivot point, the short arm rotates at the third lock pivot point and the fourth lock pivot point, and the lock block rotates at the first lock pivot point,
    wherein at a point in the rotation where the short arm and the front arm of the lever align, a combination of an aligned length of the short arm and the front arm is longer than a straight-line distance from the second lock pivot point to the third lock pivot point, wherein a resistance from further rotation of the lock assembly is created,
    wherein at the point in the rotation, the lock block continues to engage the first notch.

5. The vehicle of claim 4, wherein from the point in the rotation, with continued rotation of the lever at the second lock pivot point and with the resistance overcome, the short arm continues to rotate at the third lock pivot point and the fourth lock pivot point,
    wherein the lock block continues to rotate at the first lock pivot point,
    wherein at a full rotation of the lever, the front portion of the lock block disengages from the first notch.

6. The vehicle of claim 3, further comprising a head tube, wherein the lock block further comprises a protrusion at a back end, wherein the lock assembly further comprises:
    a second lock engagement piece coupled to the head tube, the second lock engagement piece comprising a second notch,
    wherein in the locked position, the protrusion engages the second notch, wherein the front fork is prevented from rotating,
    wherein in the unlocked position, the protrusion is disengaged from the second notch.

7. The vehicle of claim 6, wherein from the locked position, a rotation of the lever at the second lock pivot point causes a rotation of the lock block at the first lock pivot point, wherein the protrusion of the lock block rotates away from the second notch.

* * * * *